US012623367B2

(12) United States Patent
Suzuki

(10) Patent No.: US 12,623,367 B2
(45) Date of Patent: May 12, 2026

(54) METHOD AND DEVICE FOR PRODUCING HONEYCOMB STRUCTURE

(71) Applicant: NGK Insulators, Ltd., Nagoya (JP)

(72) Inventor: Ryuki Suzuki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 460 days.

(21) Appl. No.: 18/179,470

(22) Filed: Mar. 7, 2023

(65) Prior Publication Data

US 2023/0294317 A1     Sep. 21, 2023

(30) Foreign Application Priority Data

Mar. 17, 2022  (JP) ................................. 2022-042564
Dec. 16, 2022  (JP) ................................. 2022-201516

(51) Int. Cl.
B01J 37/00 (2006.01)
B26D 3/06 (2006.01)

(52) U.S. Cl.
CPC ................ B26D 3/06 (2013.01); B01J 37/00 (2013.01)

(58) Field of Classification Search
CPC ............. B26D 3/06; B01J 35/56; B01J 37/00; B01J 35/57
See application file for complete search history.

(56) References Cited

U.S. PATENT DOCUMENTS 5,145,539 A * 9/1992 Horikawa ................ B01J 35/57
                                                        428/116
5,800,787 A * 9/1998 Kato ........................ F01N 3/281
                                                        219/205

6,060,148 A * 5/2000 Matsubara ............ F01N 3/2828
                                                        428/116
6,248,421 B1 * 6/2001 Koike ................ B01D 53/9454
                                                        428/116
7,247,184 B2 * 7/2007 Frost ...................... B28B 3/269
                                                        428/116
9,139,479 B2 * 9/2015 Chapman ........... B01D 46/2484
12,070,874 B2 * 8/2024 Naito ...................... B28B 11/12
2006/0198984 A1 * 9/2006 Aoki ................ B01D 53/9454
                                                        428/116
2006/0292330 A1 * 12/2006 Ohno ................ B01D 46/2484
                                                        428/116
2007/0004592 A1 * 1/2007 Ohno ...................... B01J 35/57
                                                        502/439

(Continued)

FOREIGN PATENT DOCUMENTS

CN        105705236 A     6/2016
JP        2015-174011 A    10/2015

OTHER PUBLICATIONS

Chinese Office Action dated Jun. 5, 2025 (Application No. 202310160970.7).

*Primary Examiner* — Dung H Bui
(74) *Attorney, Agent, or Firm* — BURR PATENT LAW, PLLC

(57) ABSTRACT

A method for producing a honeycomb structure includes: a step of adjusting a penetration depth of a processing tool from an outer peripheral surface of a honeycomb structure base body having the honeycomb structure portion to a radially inward direction; and a step of forming at least one slit in the honeycomb structure base body according to the adjusted penetration depth, and wherein the penetration depth is adjusted by measuring a wall thickness of the outer peripheral wall of the honeycomb structure base body and then adding a predetermined value to the wall thickness.

10 Claims, 5 Drawing Sheets

(56)  References Cited

U.S. PATENT DOCUMENTS

| | | | |
|---|---|---|---|
| 2009/0291841 A1* | 11/2009 | Ohno | B01D 46/2429 |
| | | | 428/116 |
| 2012/0076699 A1* | 3/2012 | Ishihara | B01J 19/2485 |
| | | | 422/174 |
| 2014/0212339 A1* | 7/2014 | Kaneda | F01N 3/2026 |
| | | | 422/173 |
| 2014/0291315 A1* | 10/2014 | Mase | B01D 46/2451 |
| | | | 219/553 |
| 2014/0294692 A1* | 10/2014 | Kikuchi | C04B 35/6316 |
| | | | 427/105 |
| 2015/0030510 A1* | 1/2015 | Mase | B01D 53/8678 |
| | | | 422/180 |
| 2015/0260066 A1 | 9/2015 | Hosoi et al. | |
| 2016/0215667 A1* | 7/2016 | Omiya | B01D 53/94 |
| 2017/0252737 A1* | 9/2017 | Kuki | B28B 11/12 |
| 2017/0260887 A1* | 9/2017 | Takase | B01D 53/94 |
| 2017/0283931 A1* | 10/2017 | Matsui | H05B 3/12 |
| 2018/0178206 A1* | 6/2018 | Ueda | B01J 20/28045 |
| 2018/0215672 A1* | 8/2018 | Kitaguchi | C04B 38/0009 |
| 2019/0291091 A1* | 9/2019 | Yamamoto | B01J 37/0018 |
| 2019/0299202 A1* | 10/2019 | Ikoma | F01N 3/2026 |
| 2022/0288811 A1* | 9/2022 | Naito | B28B 11/04 |
| 2023/0249170 A1* | 8/2023 | Sakai | B01J 35/33 |
| | | | 422/174 |
| 2023/0286190 A1* | 9/2023 | Naito | B28B 11/007 |
| 2023/0304429 A1* | 9/2023 | Sakai | F01N 3/2026 |
| 2023/0311110 A1* | 10/2023 | Osada | B01J 35/33 |
| | | | 422/174 |
| 2023/0311111 A1* | 10/2023 | Yoshioka | B01J 23/44 |
| | | | 428/116 |

* cited by examiner

METHOD AND DEVICE FOR PRODUCING HONEYCOMB STRUCTURE

FIELD OF THE INVENTION

The present invention relates to a method and device for producing a honeycomb structure.

BACKGROUND OF THE INVENTION

In general, electrically heating catalysts (EHCs) are known. The EHCs are for purifying an exhaust gas emitted when an engine (internal combustion engine) is in a cold state immediately after the engine is started, by arranging electrodes on a honeycomb structure made of conductive ceramics, and heating the honeycomb structure itself by energization to increase a temperature of a catalyst supported on the honeycomb structure to an activation temperature before starting the engine.

As described in Patent Literature 1 below, a honeycomb structure includes: a pillar shaped honeycomb structure portion having an outer peripheral wall and a partition wall disposed on an inner side of the outer peripheral wall; and a pair of electrode portions for attaching electrodes. By applying a voltage to the honeycomb structure through the electrodes and the electrode portions, the honeycomb structure generates heat. For the purpose of suppressing bias in temperature distribution of the honeycomb structure when a voltage is applied or the like, the honeycomb structure portion is provided with a plurality of slits each extending radially inward from the outer peripheral wall of the honeycomb structure portion and extending in an extending direction of cells of the honeycomb structure portion. Each of the slits is formed using a processing tool such as Leuter. More particularly, the slits are formed by inserting a processing tool from the outside of the outer peripheral wall into the honeycomb structure portion by a predetermined set amount (fixed value).

CITATION LIST

Patent Literature

[Patent Literature 1] Japanese Patent Application Publication No. 2015-174011 A

SUMMARY OF THE INVENTION

In the conventional method for producing the honeycomb structure, the slits are formed by inserting a processing tool into the honeycomb structure portion by a predetermined set amount from the outside of the outer peripheral wall. Therefore, if the wall thickness of the outer peripheral wall is thicker than expected, there is a risk that the processing tool cannot penetrate the outer peripheral wall and incomplete slits are formed. On the other hand, if the wall thickness of the outer peripheral wall is thinner than expected, there is a risk that the processing tool may enter the honeycomb structure portion more than necessary and damage the partition wall unnecessarily.

The present invention has been made to solve the above problems. An object of the present invention is to provide a method and device for producing a honeycomb structure, which can more surely form the slits and reduce the risk of unnecessarily damaging the partition wall.

Aspect 1.

In an embodiment, the present invention relates to a method for producing a honeycomb structure, the honeycomb structure comprising a honeycomb structure portion having: an outer peripheral wall; and a partition wall arranged on an inner side of the outer peripheral wall, the partition wall defining a plurality of cells each extending from one end face to other end face to form a flow path, the honeycomb structure further comprising a plurality of slits each extending radially inward from an outer peripheral surface of the honeycomb structure and extending in an extending direction of the cells, wherein the method comprises: a step of adjusting a penetration depth of a processing tool from an outer peripheral surface of a honeycomb structure base body having the honeycomb structure portion to a radially inward direction; and a step of forming at least one slit in the honeycomb structure base body according to the adjusted penetration depth, and wherein the penetration depth is adjusted by measuring a wall thickness of the outer peripheral wall of the honeycomb structure base body and then adding a predetermined value to the wall thickness.

Aspect 2.

The present invention may relate to the method for producing a honeycomb structure according to the aspect 1, wherein adjusting the penetration depth comprises adjusting the penetration depth by measuring the wall thickness of the outer peripheral wall on both the one end face and the other end face, defining the wall thickness of the outer peripheral wall on the one end face as a first wall thickness, defining the wall thickness of the outer peripheral wall on the other end face as a second wall thickness, and adding a predetermined value to one of the first and second wall thicknesses when one of the first and second wall thicknesses is thicker than the other.

Aspect 3.

The present invention may relate to the method for producing a honeycomb structure according to the aspect 1 or 2, wherein the predetermined value is $t \times 0.1$ or more and $p \times 0.35$ or less, in which t is a thickness of the processing tool (mm), and p is a pitch between the cells (mm).

Aspect 4.

The present invention may relate to the method for producing a honeycomb structure according to any one of the aspects 1 to 3, wherein the honeycomb structure base body further comprises a pair of electrode layers each arranged on the outer surface of the outer peripheral wall so as to extend in a form of a band in an extending direction of the cells across a central axis of the honeycomb structure portion, and wherein adjusting the penetration depth when forming the slits at positions where the electrode layers are provided comprises adjusting the penetration depth by measuring the wall thickness of the outer peripheral wall of the honeycomb structure base body and a thickness of each of the electrode layers, and then adding a predetermined value to the total thickness value of the thickness of the honeycomb structure base body and the thicknesses of the electrode layers.

Aspect 5.

The present invention may relate to the method for producing a honeycomb structure according to the aspect 4, wherein adjusting the penetration depth when forming the slits at the positions where the electrode layers are provided comprises adjusting the penetration depth by measuring the wall thickness of the outer peripheral wall and the thicknesses of the electrode layers on both the one end face and the other end face, defining the total value of the wall thickness of the outer peripheral wall and the thickness of the electrode layer on the one end face as a first total value, defining the total value of the wall thickness of the outer peripheral wall and the thickness of the electrode layer on the other end face as a second total value, and adding a predetermined value to one of the first and second total values when one of the first and second total values is larger than the other.

Aspect 6.

The present invention may relate to the method for producing a honeycomb structure according to any one of the aspects 1 to 5, further comprising a step of specifying an outer peripheral surface position of the honeycomb structure base body at a plurality of positions aligned in the extending direction of the cells, wherein, when forming the slits, the honeycomb structure base body and the processing tool are relatively displaced based on the outer peripheral surface position specified at the plurality of positions.

Aspect 7.

In an embodiment, the present invention relates to a device for producing a honeycomb structure, the honeycomb structure comprising a honeycomb structure portion having: an outer peripheral wall; and a partition wall arranged on an inner side of the outer peripheral wall, the partition wall defining a plurality of cells each extending from one end face to other end face to form a flow path, the honeycomb structure further comprising a plurality of slits extending radially inward from an outer peripheral surface of the honeycomb structure and extending in an extending direction of the cells, wherein the device comprises: a holding portion for holding a honeycomb structure base body having the honeycomb structure portion; a processing tool for forming the plurality of slits in the honeycomb structure base body held by the holding portion; at least one measurement unit for measuring a wall thickness of the outer peripheral wall of the honeycomb structure base body; and a control unit for performing control such that a predetermined value is added to the wall thickness measured by the measurement unit to adjust a penetration depth of the processing tool from the outer peripheral surface of the honeycomb structure base body to a radially inward direction, and the processing tool is penetrated from the outer peripheral surface of the honeycomb structure base body to the radially inward direction at the adjusted depth.

Aspect 8.

The present invention may relate to the device for producing a honeycomb structure according to the aspect 7, wherein the measurement unit measures the wall thickness of the outer peripheral wall on both the one end face and the other end face, and wherein the control unit defines the wall thickness of the outer peripheral wall on the one end face as a first wall thickness, defines the wall thickness of the outer peripheral wall on the other end face as a second wall thickness, and adds a predetermined value to one of the first and second wall thicknesses to adjust the penetration depth when one of the first and second wall thicknesses is thicker than the other.

Aspect 9.

The present invention may relate to the device for producing a honeycomb structure according to the aspect 7 or 8, wherein the predetermined value is t×0.1 or more and p×0.35 or less, in which t is a thickness of the processing tool (mm), and p is a pitch between the cells (mm).

Aspect 10.

The present invention may relate to the device for producing a honeycomb structure according to any one of the aspects 7 to 9, wherein the honeycomb structure base body further comprises a pair of electrode layers each arranged on the outer surface of the outer peripheral wall so as to extend in a form of a band in an extending direction of the cells across a central axis of the honeycomb structure portion, and wherein the measurement unit measures the wall thickness of the outer peripheral wall of the honeycomb structure base body and a thickness of each of the electrode layers at positions where the electrode layers are provided, and wherein the control unit adjusts the penetration depth by adding a predetermined value to the total value of the thickness of the honeycomb structure base body and the thicknesses of the electrode layers when forming the slits at the positions where the electrode layers are provided.

Aspect 11.

The present invention may relate to the device for producing a honeycomb structure according to the aspect 10, wherein the measurement unit measures the wall thickness of the outer peripheral wall and the thicknesses of the electrode layers on both the one end face and the other end face, and wherein the control units defines the total value of the wall thickness of the outer peripheral wall and the thickness of the electrode layer on the one end face as a first total value, defines the total value of the wall thickness of the outer peripheral wall and the thickness of the electrode layer on the other end face as a second total value, and adjusts the penetration depth by adding a predetermined value to one of the first and second total values when one of the first and second total values is larger than the other.

Aspect 12.

The present invention may relate to the device for producing a honeycomb structure according to any one of the aspects 7 to 11, further comprising an outer peripheral surface position specifying unit for specifying an outer peripheral surface position of the honeycomb structure base body at a plurality of positions aligned in the extending direction of the cells, wherein the control unit controls relative displacement of the honeycomb structure base body and the processing tool based on the outer peripheral surface position specified at the plurality of positions.

According to an embodiment of the method and device for the honeycomb structure of the present invention, it is possible to form the slits more surely and reduce the risk of unnecessarily damaging the partition wall.

DETAILED DESCRIPTION OF THE INVENTION

Hereinafter, embodiments for carrying out the present invention will be described with reference to the drawings. The present invention is not limited to each embodiment, and components can be modified and embodied without departing from the spirit of the present invention. Further, various inventions can be formed by appropriately combining a plurality of components disclosed in each embodiment. For example, some components may be removed from all of the components shown in the embodiments. Furthermore, the components of different embodiments may be optionally combined.

Figure 1:
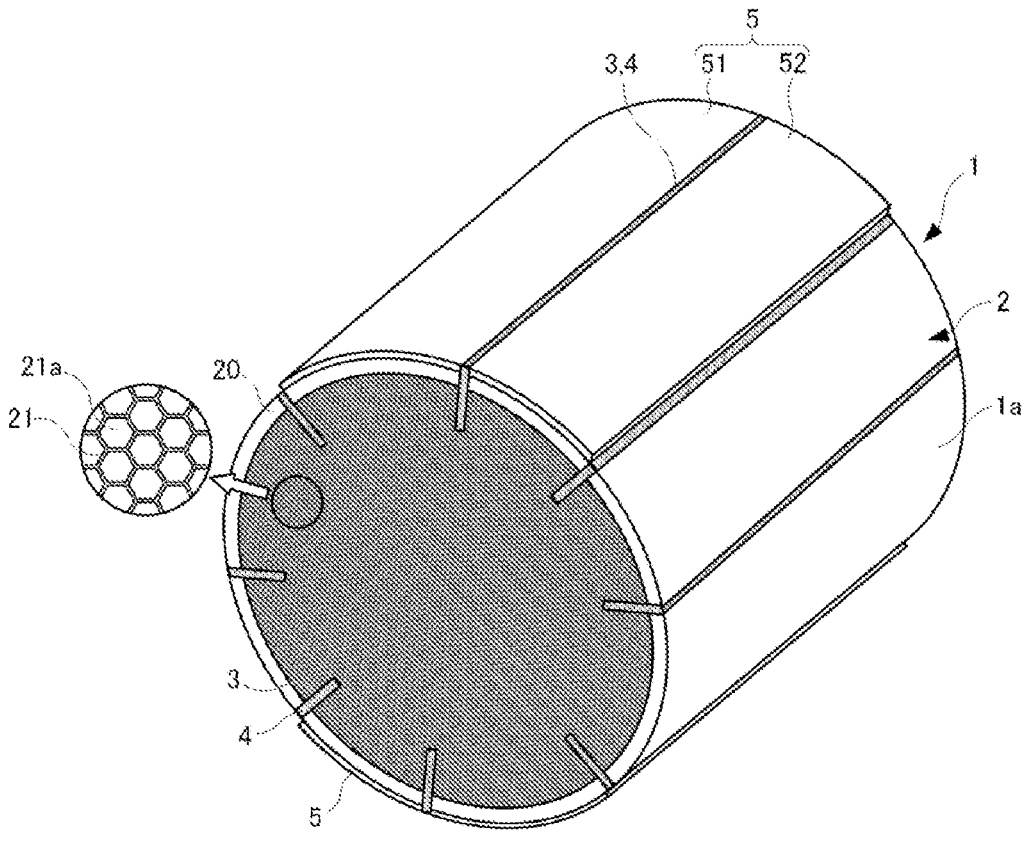
FIG. 1 is a perspective view showing a honeycomb structure produced by a method for producing a honeycomb structure according to an embodiment of the present invention.

FIG. 1 is a perspective view showing a honeycomb structure 1 produced by a method for producing the honeycomb structure 1 according to an embodiment of the present invention. The honeycomb structure 1 shown in FIG. 1 includes: a honeycomb structure portion 2; a plurality of slits 3; a filling material 4; and a pair of electrode layers 5.

The honeycomb structure portion 2 is a pillar shaped member made of ceramics, and includes: an outer peripheral wall 20; and a partition wall 21 which is arranged on an inner side of the peripheral wall 20 and defines a plurality of cells 21a each extending from one end face to other end face to form a flow path.

An outer shape of the honeycomb structure 2 is not particularly limited as long as it has a pillar shape. For example, it can be a pillar shape having circular end faces (cylindrical shape), a pillar shape having oval end faces, and other shapes such as a pillar shape having polygonal (rectangular, pentagonal, hexagonal, heptagonal, octagonal, etc.) end faces. The pillar shape is understandable as a three-dimensional shape having a thickness in an extending direction of the cells 21a (axial direction of the honeycomb structure portion 2). A ratio of an axial length of the honeycomb structure portion 2 to a diameter or width of the end face of the honeycomb structure portion 2 (aspect ratio) is arbitrary. The pillar shape may also include a shape in which the axial length of the honeycomb structure portion 2 is shorter than the diameter or width of the end face (flat shape).

As for the size of the honeycomb structure portion 2, an area of the end faces is preferably from 2,000 to 20,000 $mm^2$, and even more preferably from 5,000 to 15,000 $mm^2$, in order to increase heat resistance (to suppress cracks generated in the circumferential direction of the outer peripheral wall 20).

A shape of each cell 21a in the cross section perpendicular to the extending direction of the cells 21a may preferably be a quadrangle, hexagon, octagon, or a combination thereof. Among these, the quadrangle and the hexagon are preferred. Such a cell shape can lead to a decreased pressure loss when an exhaust gas flows through the honeycomb structure portion 2, which can provide improved purification performance.

The partition wall 21 that defines the cells 21a preferably has a thickness of from 0.1 to 0.3 mm, and more preferably from 0.1 to 0.2 mm. The thickness of 0.1 mm or more of the partition wall 21 can suppress a decrease in the strength of the honeycomb structure portion 2. The thickness of the partition wall 21 of 0.3 mm or less can suppress a larger pressure loss when an exhaust gas flows through the honeycomb structure portion 2 if the honeycomb structure portion 2 is used as a catalyst support to support a catalyst. In the present invention, the thickness of the partition wall 21 is defined as a length of a portion passing through the partition wall 21, among line segments connecting the centers of gravity of adjacent cells 21a, in the cross section perpendicular to the extending direction of the cells 21a.

The honeycomb structure portion 2 preferably has a cell density of from 40 to 150 cells/$cm^2$, and more preferably from 70 to 100 cells/$cm^2$, in the cross section perpendicular to the extending direction of the cells 21a. The cell density in such a range can allow the purification performance of the catalyst to be increased while reducing the pressure loss when the exhaust gas flows. The cell density of 40 cells/$cm^2$ or more can allow a catalyst supported area to be sufficiently ensured. The cell density of 150 cells/$cm^2$ or less can prevent the pressure loss when the exhaust gas flows through the honeycomb structure portion 2 from being increased if the honeycomb structure portion 2 is used as a catalyst support to support the catalyst. The cell density is a value obtained by dividing the number of cells by the area of one end face portion of the honeycomb structure portion 2 excluding the outer peripheral wall 20 portion.

The provision of the outer peripheral wall 20 of the honeycomb structure portion 2 is useful from the viewpoints of ensuring the structural strength of the honeycomb structure portion 2 and suppressing the leakage of a fluid flowing through the cells 21a from the outer peripheral wall 20. Specifically, the thickness of the outer peripheral wall 20 is preferably 0.05 mm or more, and more preferably 0.10 mm or more, and even more preferably 0.15 mm or more. However, if the outer peripheral wall 20 is too thick, the strength will be too high, and a strength balance between the outer peripheral wall 20 and the partition wall 21 will be lost, resulting in a decrease in thermal shock resistance. Therefore, the thickness of the outer peripheral wall 20 is preferably 1.0 mm or less, and more preferably 0.7 mm or less, and even more preferably 0.5 mm or less. The thickness of the outer peripheral wall 20 is defined as a thickness of the outer peripheral wall in the normal line direction relative to the tangent line at a measured point when the point of the outer peripheral wall 20 where the thickness is to be measured is observed in the cross section perpendicular to the extending direction of the cells 21a.

The honeycomb structure portion 2 is made of ceramics and is preferably electrically conductive. Volume resistivity is not particularly limited as long as the honeycomb structure portion 2 is capable of heat generation by Joule heat when a current is applied. Preferably, the volume resistivity is from 0.1 to 200 Ωcm, and more preferably from 1 to 200 Ωcm. As used herein, the volume resistivity of the honeycomb structure portion 2 refers to a value measured at 25° C. by the four-terminal method.

The honeycomb structure portion 2 can be made of a material selected from the group consisting of oxide ceramics such as alumina, mullite, zirconia and cordierite, and non-oxide ceramics such as silicon carbide, silicon nitride and aluminum nitride, although not limited thereto. Further, silicon-silicon carbide composite materials and silicon carbide/graphite composite materials can also be used. Among these, it is preferable that the material of the honeycomb structure portion 2 contains ceramics mainly based on a silicon-silicon carbide composite material or silicon carbide, in terms of balancing heat resistance and electrical conductivity. The phrase "the material of the honeycomb structure portion 2 is mainly based on silicon-silicon carbide composite material" means that the honeycomb structure portion 2 contains 90% by mass of more of silicon-silicon carbide composite material (total mass) based on the total material. Here, the silicon-silicon carbide composite material contains silicon carbide particles as an aggregate and silicon as a binding material to bind the silicon carbide particles, preferably in which a plurality of silicon carbide particles are bound by silicon such that pores are formed between the silicon carbide particles. The phrase "the material of the honeycomb structure portion 2 is mainly based on silicon carbide" means that the honeycomb structure portion 2 contains 90% or more of silicon carbide (total mass) based on the total material.

When the honeycomb structure portion 2 contains the silicon-silicon carbide composite material, a ratio of the "mass of silicon as a binding material" contained in the honeycomb structure portion 2 to the total of the "mass of silicon carbide particles as an aggregate" contained in the honeycomb structure portion 2 and the "mass of silicon as a binding material" contained in the honeycomb structure portion 2 is preferably from 10 to 40% by mass, and more preferably from 15 to 35% by mass.

The partition wall 21 may be porous. When the partition wall 21 is porous, the porosity of the partition wall 21 is preferably from 35 to 60%, and even more preferably from 35 to 45%. The porosity is a value measured by a mercury porosimeter.

The partition wall 21 of the honeycomb structure portion 2 preferably has an average pore diameter of from 2 to 15 μm, and even more preferably from 4 to 8 μm. The average pore diameter is a value measured by a mercury porosimeter.

The slits 3 extend radially inward from an outer peripheral surface 1a of the honeycomb structure 1 and extend in the extending direction of the cells 21a. The slits 3 are spaced apart from each other in the circumferential direction. The slits 3 extend from one end face to the other end face of the honeycomb structure portion 2 in the extending direction of the cells 21a. The number of the slits 3 in the circumferential direction may be 2 or more and 12 or less. Each of the slits 3 preferably has a depth of 60% or less, more preferably 1% or more and 25% or less, of the radius of the honeycomb structure portion 2 in the cross section perpendicular to the extending direction of the cells 21a. The width of each slit 3 may be 0.4 mm or more and 2.0 mm or less. The depth of each slit 3 may be understood as a distance from the outer peripheral surface of the outer peripheral wall 20 to the tip of each slit 3.

In addition, the outer peripheral surface of the outer peripheral wall 20 forms at least a part of the outer peripheral surface of the honeycomb structure 1. More particularly, at a position where the outer peripheral surface of the outer peripheral wall 20 is exposed, that is, at a position where the outer peripheral surface of the outer peripheral wall 20 is not covered with the electrode layers 5, the outer peripheral surface of the outer peripheral wall 20 forms the outer peripheral surface of the honeycomb structure 1. On the other hand, at the positions where the pair of electrode layers 5 are provided, the outer peripheral surfaces of the pair of electrode layers 5 form the outer peripheral surface of the honeycomb structure 1. From another point of view, when observing the appearance of the honeycomb structure 1, the surface on which the plurality of slits 3 appear may be the outer peripheral surface of the honeycomb structure 1. It may be understood that the outer peripheral surface of the honeycomb structure 1 does not include the end face of the honeycomb structure portion 2 where the cells 21a are open.

The filling material 4 fills in the slits 3. At least part of a space of each slit 3 is preferably filled with the filling material 4. The filling material 4 preferably fills 50% or more of the space of each slit 3, and more preferably fills the entire space of each slit 3. In the embodiment as shown in FIG. 1, the filling material 4 fills the entire space of the slits 3, forms planes integral with both end faces of the honeycomb structure portion 2, and forms a curved surface integral with the outer peripheral surface 1a of the honeycomb structure 1. However, the filling material 4 may be filled up to a position axially inner than the end face of the honeycomb structure portion 2, or may be filled up to a position radially inner than the outer peripheral surface 1a of the honeycomb structure 1.

When the main component of the honeycomb structure portion 2 is silicon carbide or a silicon-silicon carbide composite material, the filling material 14 preferably contains at least 20% by mass silicon carbide, and more preferable from 20 to 70% by mass of silicon carbide. This can allow a thermal expansion coefficient of the filling material 14 to be close to that of the honeycomb structure portion 2, thereby improving the thermal shock resistance of the honeycomb structure portion 2. The filling material 14 may contain 30% by mass or more of silica, alumina, or the like.

The pair of electrode layers 5 are provided so as to extend in a form of a band in the extending direction of the cells 21a on the outer surface of the outer peripheral wall 20 across a central axis of the honeycomb structure portion 2. Although not shown, electrode terminals may be provided on the electrode layers 5. A voltage can be applied to the honeycomb structure portion 2 through those electrode terminals and electrode layers 5 to cause heat generation of the honeycomb structure portion 2.

Each of the pair of electrode layers 5 has first and second partial electrode layers 51, 52 separated by each slit 3. That is, at the positions where the electrode layers 5 are provided, each slit 3 extends radially inward from each electrode layer 5 and opens on the outer peripheral surface of each electrode layer 5. Each slit 3 may be filled with the filling material 4 between the first and second partial electrode layers 51, 52 as well.

The volume resistivity of the electrode layers is preferably $\frac{1}{200}$ or more and $\frac{1}{10}$ or less of the electric resistivity of the honeycomb structure portion 2, in terms of facilitating the flow of electricity to the electrode layers.

Each electrode layer may be made of conductive ceramics, a metal, or a composite material (cermet) of a metal and a conductive ceramic. Examples of the metal include a single metal of Cr, Fe, Co, Ni, Si or Ti, or an alloy containing at least one metal selected from the group consisting of those metals. Non-limiting examples of the conductive ceramics include silicon carbide (SiC), and metal compounds such as metal silicides such as tantalum silicide ($TaSi_2$) and chromium silicide ($CrSi_2$).

As a method for producing the honeycomb structure 1 having the electrode layers 5, first, an electrode layer forming raw material containing ceramic materials is applied onto a side surface of a honeycomb dried body and dried to form a pair of unfired electrode layers on the outer surface of the outer peripheral wall 20 so as to extend in the form of the band in the extending direction of the cells 21a, across the central axis of the honeycomb dried body, thereby providing a honeycomb dried body with unfired electrode layers. Then, the honeycomb dried body with unfired electrode layers is fired to produce a honeycomb fired body having a pair of electrode layers. The honeycomb structure 1 having the electrode layers 5 is thus obtained. It should be noted that the pair of electrode layers 5 are not essential components, and the honeycomb structure 1 may not include the pair of electrode layers 5.

Figure 2:
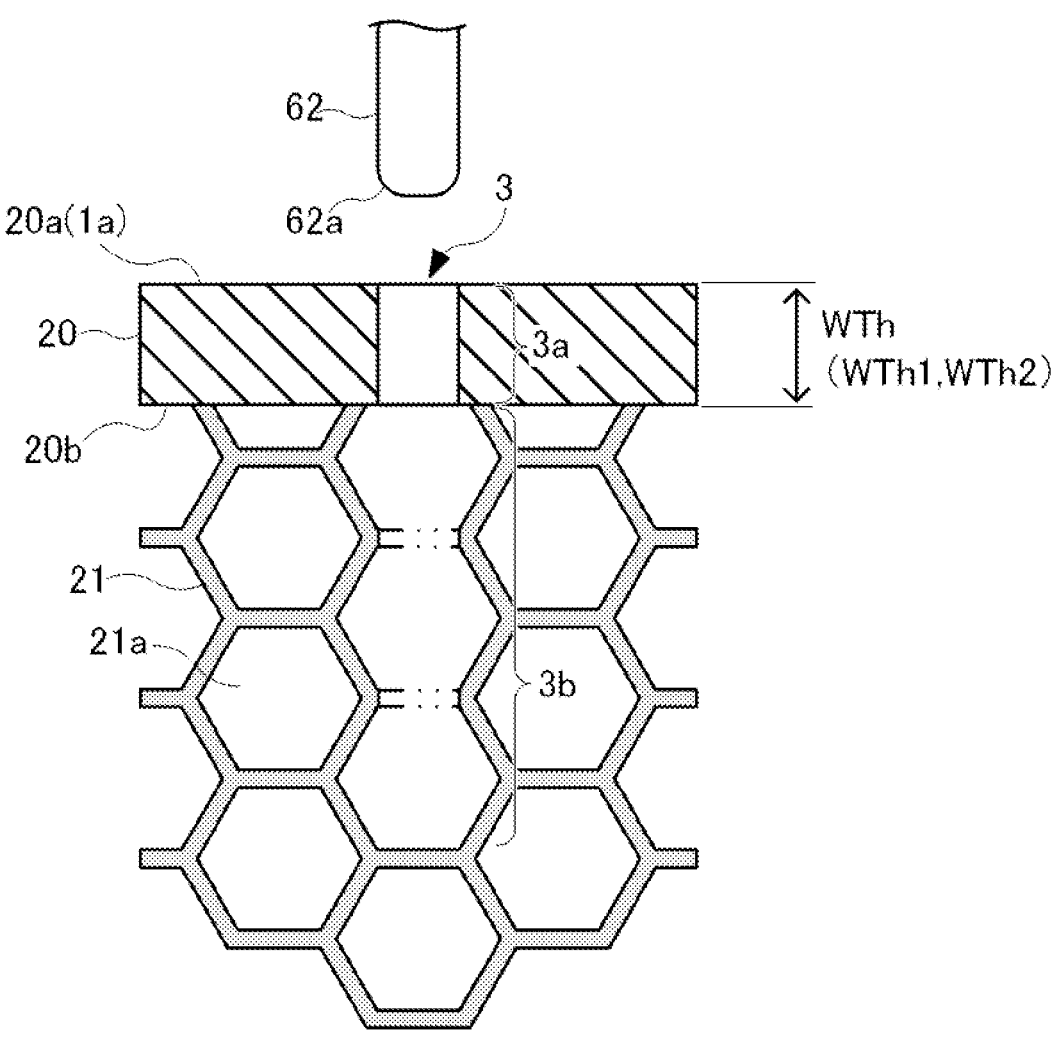
FIG. 2 is a cross-sectional view of a slit and its periphery at a position where the outer peripheral wall of FIG. 1 is exposed.

Next, FIG. 2 is a cross-sectional view of the slit 3 and its periphery at a position where the outer peripheral wall 20 of FIG. 1 is exposed. FIG. 2 shows the slit 3 before being filled with the filling material 4. As shown in FIG. 2, the slit 3 has a first groove portion 3a formed in the outer peripheral wall 20 and a second groove portion 3b in communication with the first groove portion 3a.

The first groove portion 3a penetrates the outer peripheral wall 20. That is, the first groove portion 3a is provided between an outer peripheral surface 20a and an inner peripheral surface 20b of the outer peripheral wall 20. At the position where the outer peripheral wall 20 is exposed as described above, the outer peripheral surface 20a of the outer peripheral wall 20 makes up the outer peripheral surface 1a of the honeycomb structure 1.

The second groove portion 3b extends from the inner peripheral surface 20b of the outer peripheral wall 20 to a radially inward direction of the honeycomb structure portion 2. In the illustrated embodiment, the second groove portion 3b is formed by removing a part of the partition wall 21 so as to connect the adjacent cells 21a, as indicated by the chain double-dashed line in the figure. However, the second groove portion 3b may be formed only by the outermost cells 21a that are in contact with the inner peripheral surface 20b of the outer peripheral wall 20. That is, the second groove portion 3b may not have the removed portion of the partition wall 21.

In FIG. 2, the first and second groove portions 3a, 3b are shown in the plane orthogonal to the extending direction of the cells 21a. These first and second groove portions 3a, 3b, i.e., the slits 3, extend in the extending direction of the cells 21a (a direction perpendicular to the plane of FIG. 2) as shown in FIG. 1.

The slits 3 can be formed by processing using a processing tool 62. The processing tool 62 may be, for example, a cutting tool such as a disc-shaped grindstone or Leutor. The processing tool 62 is penetrated into the honeycomb structure 1 from the outer peripheral wall 20 (the outer peripheral surface 1a of the honeycomb structure 1) to the radially inward direction. Further, the processing tool 62 is moved in the extending direction of the cells 21a while being penetrated into the inside of the honeycomb structure 1. By processing with the processing tool 62, at least the first groove portion 3a penetrating the outer peripheral wall 20 can be formed. The second groove portion 3b may be formed by processing using the processing tool 62, or may be formed by producing a precursor (honeycomb formed body) of the honeycomb structure portion 2 in a state where a part of the partition wall 21 is removed. The method for producing the honeycomb formed body in which a part of the partition wall 21 is removed includes a method for partially closing a part of a die to remove a part of the partition wall. When the second groove portion 3b is formed only by the outermost cells 21a as described above, the partition wall 21 may not be processed by the processing tool 62.

Figure 3:
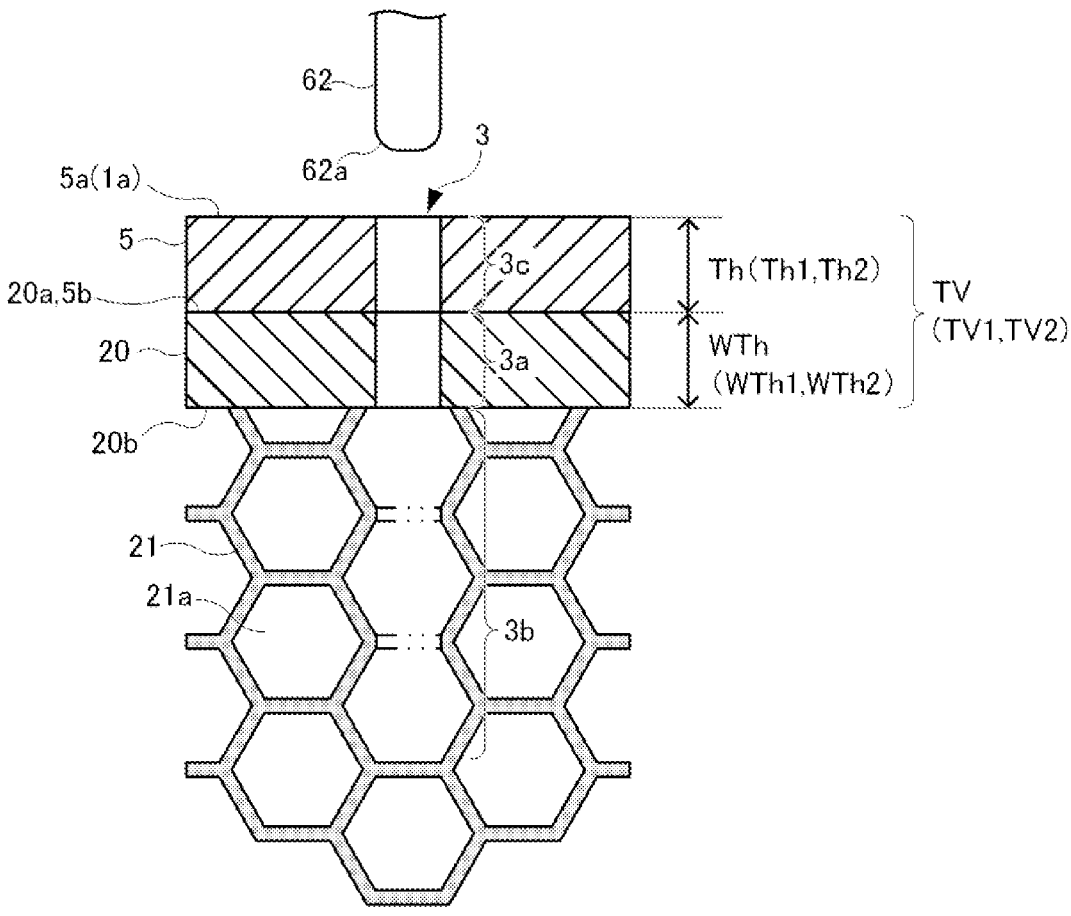
FIG. 3 is a cross-sectional view of a slit and its periphery at a position where the electrode layer of FIG. 1 is provided.

Next, FIG. 3 is a sectional view of the slit 3 and its periphery at the position where the electrode layer 5 of FIG. 1 is provided. FIG. 3 shows the slit 3 before being filled with the filling material 4. As shown in FIG. 3, at the position where the electrode layer 5 is provided, the slit 3 further includes a third groove portion 3c formed in the electrode layer 5 that is in communication with the first groove portion 3a.

The third groove portion 3c penetrates the electrode layer 5. That is, the third groove portion 3c is provided between an outer peripheral surface 5a and an inner peripheral surface 5b of the electrode layer 5. At the position where the electrode layer 5 is provided as described above, the outer peripheral surface 5a of the electrode layer 5 makes up the outer peripheral surface 1a of the honeycomb structure 1.

At the position where the electrode layer 5 is provided, the processing tool 62 is penetrated into the honeycomb structure 1 from the outer peripheral surface 5a of the electrode layer 5 (the outer peripheral surface 1a of the honeycomb structure 1) to the radially inward direction. Further, the processing tool 62 is moved in the extending direction of the cells 21a while being penetrated into the inside of the honeycomb structure 1. By processing with the processing tool 62, at least the first groove portion 3a penetrating the outer peripheral wall 20 and the third groove portion 3c penetrating the electrode layer 5 can be formed.

Figure 4:
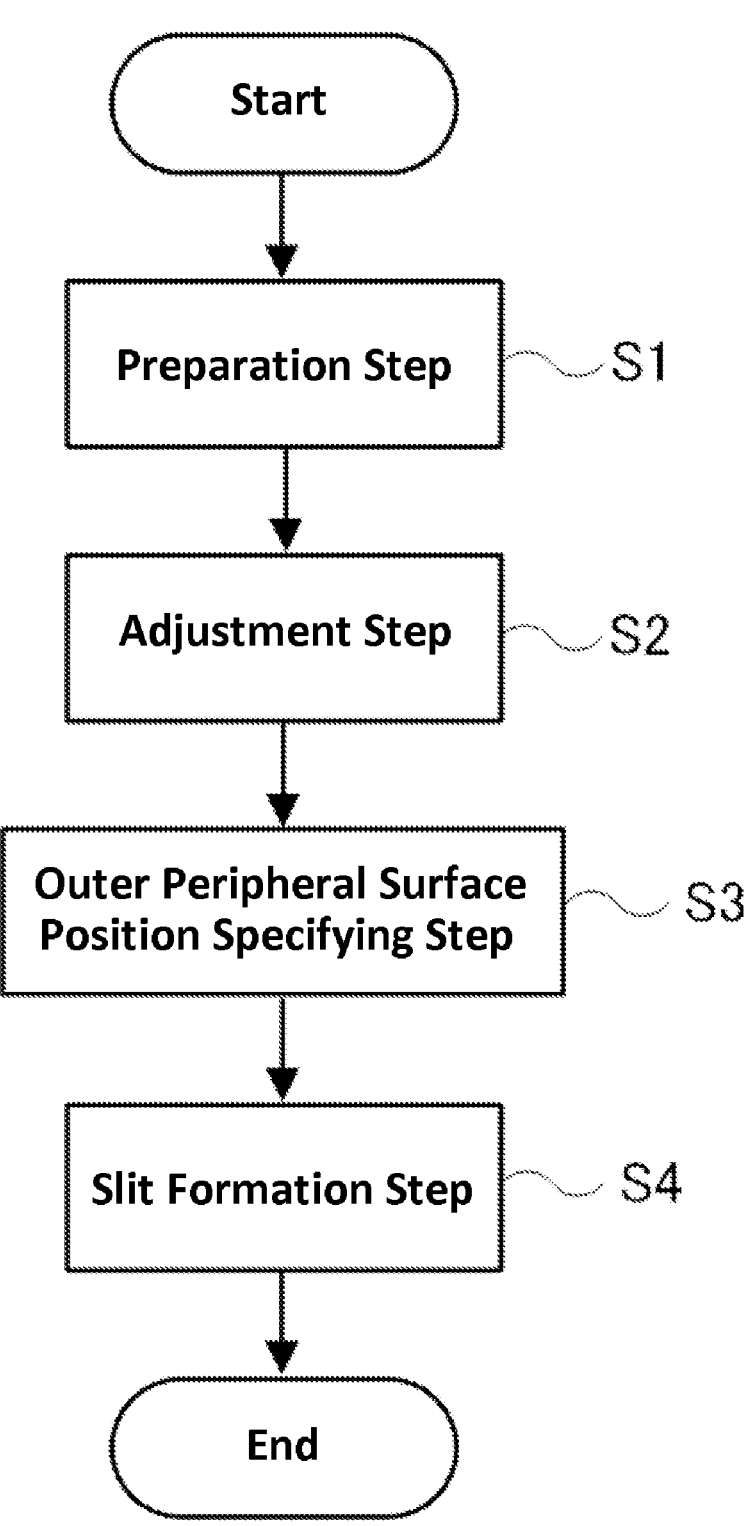
FIG. 4 is a flowchart showing a method for producing a honeycomb structure according to an embodiment of the present invention.

Next, FIG. 4 is a flowchart showing a method for producing the honeycomb structure 1 according to an embodiment of the present invention. The method for producing the honeycomb structure 1 as shown in FIG. 4 is for producing a honeycomb structure 1 including a honeycomb structure portion 2 having: an outer peripheral wall 20 and a partition wall 21 arranged on an inner side of the outer peripheral wall 20, the partition wall 21 defining a plurality of cells 21a, each of the cells 21a forming a flow path extending from one end face to other end face; a plurality of slits 3 each extending radially inward from an outer peripheral surface 1a of the honeycomb structure 1 and extending in an extending direction of the cells 21a; and a pair of electrode layers 5 arranged on an outer surface of the outer peripheral wall 20 so as to extend in a form of a band in the extending direction of the cells 21a across a central axis of the honeycomb structure portion 2.

As shown in FIG. 4, the method for producing the honeycomb structure 1 according to the embodiment of the present invention includes: a preparation step (step S1); an adjustment step (step S2) and a slit formation step (step S4). The method for producing the honeycomb structure 1 may further include an outer peripheral surface position specifying step (step S3).

Figure 5:
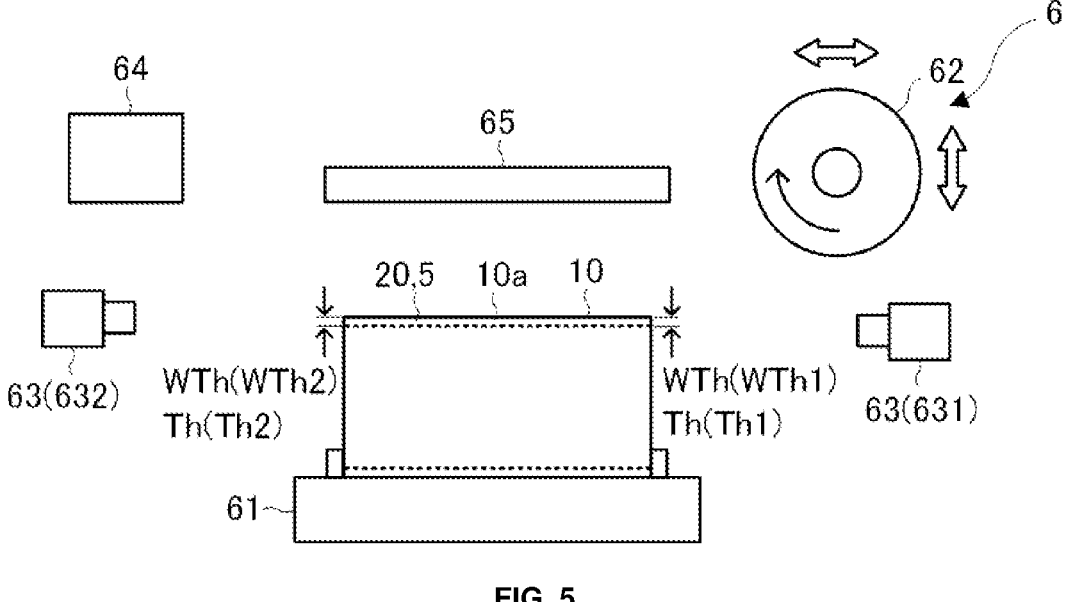
FIG. 5 is an explanatory view showing a device for producing a honeycomb structure according to an embodiment of the present invention.

The preparing step (step S1) is a step of preparing a honeycomb structure base body 10 (see FIG. 5). The honeycomb structure base body 10 includes the honeycomb structure portion 2. The honeycomb structure base body 10 may further include a pair of electrode layers 5, and may have the same structure as that of the honeycomb structure 1 of FIG. 1, with the exception that the former does not have the slits 3 and the filling material 4. In the preparing step, the honeycomb structure base body 10 produced by a manufacturer may be available. That is, the preparing step does not have to involve the production of the honeycomb structure base body 10.

The adjustment step (step S2) is a step of adjusting a penetration depth of the processing tool 62 from the outer peripheral surface 10a of the honeycomb structure body 10 to a radially inward direction. The penetration depth of the processing tool 62 is defined by an amount of relative displacement between the honeycomb structure base body 10 and the processing tool 62. The penetration depth may be defined by an amount in which one of the honeycomb structure base body 10 and the processing tool 62 is fixed, the other is approached toward the one, or an amount in which both the honeycomb structure base body 10 and the processing tool 62 may be movably provided and they are approached to each other.

The penetration depth is adjusted by measuring a wall thickness WTh (see FIG. 2) of the outer peripheral wall 20 of the honeycomb structure base body 10 and then adding a predetermined value to the wall thickness WTh. By adjusting the penetration depth of the processing tool 62 based on the measured value of the wall thickness WTh, the processing according to the wall thickness WTh can be performed even if the wall thickness WTh is thicker or thinner than that initially assumed. This allows the slits 3 to be more reliably formed, and the risk of unnecessarily damaging the partition wall 21 to be reduced. It is also understandable that the adjustment step according to the present embodiment includes measuring the wall thickness WTh of the outer peripheral wall 20 and determining the penetration depth of the processing tool 62 based on the measured wall thickness WTh.

The wall thickness WTh may be measured each time the slit 3 is processed, or may be measured for each honeycomb structure base body 10. Further, the measurement of the wall thickness WTh at the position where the outer peripheral surface of the outer peripheral wall 20 is exposed may be performed for each lot of the honeycomb structure base bodies 10. The lot of honeycomb structure base bodies 10 is understood to mean a plurality of honeycomb structure base bodies 10 continuously produced under the same production conditions, such as settings of material ratios and nozzles for extruding materials. The continuously produced honeycomb structure base body 10 is cut into desired sizes to obtain a plurality of honeycomb structure base bodies 10.

The predetermined value added to the wall thickness WTh can be determined so that the processing tool 62 can be penetrated up to the inside of the inner peripheral surface 20b of the outer peripheral wall 20. As shown in FIG. 2, when a curved surface portion 62a is provided at the tip portion of the processing tool 62, the predetermined value can be determined so that at least the curved surface portion 62a is penetrated up to the inside of the inner peripheral surface 20b of the outer peripheral wall 20. Moreover, the predetermined value can be determined according to the depth of each slit 3, and can be determined so that the tip portion of the processing tool 62 is not unnecessarily contacted with the partition wall 21 located ahead in the penetration direction of the processing tool 62. As will be described later with examples, when the thickness of the processing tool 62 is t (mm) and the pitch between the cells 21a is p (mm), the predetermined value (mm) added to the wall thickness WTh is preferably t×0.1 or more and p×0.35 or less. The predetermined value of t×0.1 or more can lead to reduction of a risk that the shape of the curved surface portion 62a of the processing tool 62 remains in the slit 3. The predetermined value of p×0.35 or less can lead to reduction of a risk that the tip portion of the processing tool 62 is unnecessarily contacted with the partition wall 21 located ahead in the penetration direction of the processing tool 62.

The measurement of the wall thickness WTh of the outer peripheral wall 20 may be performed by any method. For example, the wall thickness WTh of the outer peripheral wall 20 can be measured by image-processing an image of the end face of the honeycomb structure base body 10. Alternatively, the wall thickness WTh of the outer peripheral wall 20 may be measured using an apparatus or a device such as a thickness gauge. The measured wall thickness WTh may be input to a control device that controls movement of the honeycomb structure base body 10 and/or the processing tool 62. The control device can determine the penetration depth of the processing tool 62 based on the input wall thickness WTh.

Further, the adjustment of the penetration depth in the adjustment step (Step S2) may include adjusting the penetration depth by measuring the wall thickness WTh of the outer peripheral wall 20 on both the one end face and the other end face of the honeycomb structure base body 10, defining the wall thickness WTh on the one end face of the outer peripheral wall 20 as a first wall thickness WTh1, defining the wall thickness WTh of the outer peripheral wall 20 on the other end face as a second wall thickness WTh2, and adding a predetermined value to one of the first and second wall thicknesses WTh1, WTh2 (the thicker one of the first and second wall thicknesses WTh1, WTh2) when one of the first and second wall thicknesses WTh1, WTh2 is thicker than the other. This can lead to more secure avoidance of any insufficient penetration depth of the processing tool 62 into the honeycomb structure base body 10, which is due to the uneven wall thickness WTh of the outer peripheral wall 20 between the one end face and the other end face, so that the slits 3 can be more reliably formed. The predetermined value (mm) added to one of the first and second wall thicknesses WTh1, WTh2 is also preferably t×0.1 or more and p×0.35 or less.

The adjustment of the penetration depth when forming the slits 3 at the positions where the electrode layers 5 are provided may be performed by measuring the wall thickness WTh of the outer peripheral wall 20 of the honeycomb structure base body 10 and a thickness Th of each electrode layer 5 (see FIG. 3), and then adding a predetermined value to the total value TV of the wall thickness WTh of the outer peripheral wall 20 and the thickness Th of each electrode layer 5. Accordingly, not only the wall thickness WTh of the outer peripheral wall 20 but also the thickness Th of each electrode layer 5 can be taken into consideration, so that the slits 3 can be more reliably formed and the risk of unnecessarily damaging the partition wall 21 can be reduced.

The thickness Th of each electrode layer 5 may be measured each time the slit 3 is processed, or may be measured for each honeycomb structure base body 10, as with the measurement of the wall thickness WTh. Moreover, the thickness Th of each electrode layer 5 may be measured for each lot of the honeycomb structure base bodies 10.

Further, the adjustment of the penetration depth when forming the slits 3 at the positions where the electrode layers 5 are provided may include adjusting the penetration depth by measuring the wall thickness WTh of the outer peripheral wall 20 and the thickness Th of each electrode layer 5 on both the one end surface and the other end surface, defining the total value TV of the wall thickness WTh1 of the outer peripheral wall 20 and the thickness Th1 of the electrode layer 5 on the one end face as a first total value TV1, defining the wall thickness WTh2 of the outer peripheral wall 20 and the thickness Th of the electrode layer on the other end face 5 as a second total value TV2, and adding a predetermined value to one of the first and second total values TV1, TV2 when one of the first and second total values TV1, TV2 is larger than the other. Accordingly, not only the wall thickness WTh of the outer peripheral wall 20 but also the thickness Th of each electrode layer 5 can be taken into consideration, leading to more reliable avoidance of any insufficient penetration depth of the processing tool 62 into the honeycomb structure base body 10, which is caused by the fact that the wall thickness WTh of the outer peripheral wall 20 and/or thickness Th of each electrode layer 5 is not uniform, so that the slits 3 can be more reliably formed.

The outer peripheral surface position specifying step (Step S3) is a step of specifying an outer peripheral surface position of the honeycomb structure base body 10 at a plurality of positions aligned in the extending direction of the cells 21a. The outer peripheral surface position is understandable as the position of the outer peripheral surface 10a of the honeycomb structure base body 10 on the plane orthogonal to the extending direction of the cells 21a. The outer peripheral surface 10a of the honeycomb structure base body 10 is the outer peripheral surface 20a of the outer peripheral wall 20 at the position where the outer peripheral wall 20 is exposed, and may be the outer peripheral surface 5a of the electrode layer 5 at the position where the electrode layer 5 is provided. Supposing that the processing tool 62 is arranged above the honeycomb structure base body 10 and the processing tool 62 is lowered to insert the processing tool 62 into the honeycomb structure base body 10, the position of the outer peripheral surface 10*a* of the honeycomb structure base body 10 may be understood as the height position of the outer peripheral surface 10*a*. The specified outer peripheral surface position of the honeycomb structure base body 10 can be used in the subsequent slit formation step.

The slit formation step (Step S4) is a step of forming at least one slit 3 in the honeycomb structure base body 10 based on the adjusted penetration depth. That is, the processing tool 62 is inserted into the honeycomb structure base body 10 up to the adjusted penetration depth, and the honeycomb structure base body 10 and the processing tool 62 are relatively moved in the extending direction of the cells 21*a*, thereby forming the slit 3. After one slit 3 is formed, other slits 3 can be formed in the same manner at positions away from the slit 3 in the circumferential direction or radial direction of the honeycomb structure base body 10.

When forming the other slit 3, the wall thickness WTh of the outer peripheral wall 20 (and the thickness Th of the electrode layer 5) is measured at that position, and based on the measured wall thickness WTh (and the thickness Th), the penetration depth of the processing tool 62 may be determined again. That is, the adjustment step and the slit formation step (and the outer peripheral surface position specifying step) may be repeated until the predetermined number of slits 3 is formed.

When the method for producing the honeycomb structure 1 includes the outer peripheral surface position specifying step (Step S3), the outer peripheral surface position specified at a plurality of positions is used as a reference (0 point position) to perform the relative displacement between the honeycomb structure base body 10 and the processing tool 62, when forming the slits 3. The outer peripheral surface position can be specified at a plurality of positions spaced at predetermined distances in the extending direction of the cells 21*a*. Each distance at which a plurality of positions are specified is arbitrary, but it may preferably be 12 mm or less. That is, when the method for producing the honeycomb structure 1 includes the outer peripheral surface position specifying step (Step S3), in the slit formation step (Step S4), the position of the processing tool 62 may be adjusted in relation to the penetration direction of the processing tool 62 into the honeycomb structure base body 10 when the processing tool 62 is once inserted into the honeycomb structure base body 10, and the honeycomb structure base body 10 and the processing tool 62 are then relatively moved in the extending direction of the cells 21*a*. Accordingly, even if there is deformation of the outer shape of the honeycomb structure base body 10 and there is displacement of the position of the outer peripheral surface 10*a* of the honeycomb structure base body 10 in the axial direction, any insufficient penetration depth of the processing tool 62 can be more reliably avoided, so that the slit 3 can be more reliably formed.

In the production method according to the present embodiment, the honeycomb structure base body 10 is determined to be the honeycomb structure 1 at the stage where the plurality of slits 3 are formed in the honeycomb structure base body 10. Any subsequent step such as filling the slits 3 with the filling material 4 may be performed on the honeycomb structure 1.

Next, FIG. 5 is an explanatory view showing a production device 6 for the honeycomb structure 1 according to an embodiment of the present invention. The production device 6 for the honeycomb structure 1 shown in FIG. 5 is for producing the honeycomb structure 1 including a honeycomb structure portion 2 having: an outer peripheral wall 20 and a partition wall 21 arranged on an inner side of the outer peripheral wall 20, the partition wall 21 defining a plurality of cells 21*a*, each of the cells 21*a* forming a flow path extending from one end face to other end face; and further including a plurality of slits 3 each extending radially inward from an outer peripheral surface 1*a* of the honeycomb structure 1 and extending in an extending direction of the cells 21*a*. The honeycomb structure 1 may further include a pair of electrode layers 5 provided on an outer surface of the outer peripheral wall 20 so as to extend in a form of a band in the extending direction of the cells 21*a* across a central axis of the honeycomb structure portion 2. The method for producing the honeycomb structure 1 described above may be carried out using the production device 6 for the honeycomb structure 1 as shown in FIG. 5, although not limited thereto.

As shown in FIG. 5, the production device 6 for the honeycomb structure 1 includes: a holding portion 61; a processing tool 62; measurement units 63, a control unit 64; and an outer peripheral surface position specifying unit 65.

The holding portion 61 is for holding the honeycomb structure base body 10 having the honeycomb structure portion 2 (see FIG. 1) (and the electrode layers 5). As described above, the honeycomb structure base body 10 may have the same structure as that of the honeycomb structure portion 2 of FIG. 1.

The processing tool 62 is for forming a plurality of slits 3 in the honeycomb structure base body 10. The honeycomb structure base body 10 held by the holding portion 61 and the processing tool 62 may be provided so as to be relatively displaceable. That is, one of the honeycomb structure base body 10 held by the holding portion 61 and the processing tool 62 may be displaceable with respect to the other, or both of them may be displaceable.

In the illustrated embodiment, the holding portion 61 is fixed to a base table (not shown), and the honeycomb structure base body 10 is placed on the holding portion 61. The holding portion 61 holds the honeycomb structure base body 10 so that it cannot be displaced in any of the peripheral and radial directions of the honeycomb structure base body 10, and the extending direction of the cells 21*a*. By performing a predetermined operation, the holding of the honeycomb structure base body 10 by the holding portion 61 can be released, and the position and orientation of the honeycomb structure base body 10 can be adjusted.

The processing tool 62 is composed of a rotatable disk-shaped grindstone, and is arranged above the honeycomb structure base body 10 held by the holding portion 61. The processing tool 62 is movably provided in the radial direction of the honeycomb structure base body 10 held by the holding portion 61 and in the extending direction of the cells 21*a* of the honeycomb structure base body 10 held by the holding portion 61. The radial direction of the honeycomb structure base body 10 may include the height direction and the left-right direction orthogonal to the plane of FIG. 5.

One slit 3 can be formed in the honeycomb structure base body 10 by lowering the processing tool 62 and moving it in the extending direction of the cells 21*a* while rotationally driving the processing tool 62. After forming one slit 3, the orientation of the honeycomb structure base body 10 and/or the position of the processing tool 62 can be adjusted to form other slits 3 in the same manner.

The measurement units 63 are for measuring the wall thickness WTh of the outer peripheral wall 20 of the honeycomb structure base body 10. The measurement unit 63 may further measure the wall thickness WTh of the outer peripheral wall 20 of the honeycomb structure base body 10 and the thickness Th of each electrode layer 5 at the position where each electrode layer 5 is provided. In the illustrated embodiment, the measurement units 63 are configured to be able to measure the wall thickness WTh (WTh1, WTh2) of the outer peripheral wall 20 and the thicknesses Th (Th1, Th2) of the electrode layers 5 on both the one end face and the other end face of the honeycomb structure base body 10. The measurement unit 63 may be configured to measure the wall thickness WTh of the outer peripheral wall 20 and the thickness of the electrode layer 5 only on the one end face of the honeycomb structure base body 10. The measurement unit 63 may be arranged so as to measure the wall thickness WTh of the outer peripheral wall 20 and the thickness Th of the electrode layer 5 at the position into which the processing tool 62 is inserted. The measurement unit 63 may be arranged so as to measure the wall thickness WTh of the outer peripheral wall 20 and the thickness Th of the electrode layer 5 at the top of the outer peripheral wall 20 (the highest position in the vertical direction).

In the illustrated embodiment, the measurement units 63 are configured by cameras. The measurement units 63 include: a first camera 631 arranged to capture an image of the outer peripheral wall 20 and the electrode layer 5 on one end face of the honeycomb structure base body 10; and a second camera 632 arranged to capture an image of the outer peripheral wall 20 and the electrode layer 5 on the other end face of the honeycomb structure base body 10. The images captured by the first and second cameras 631, 632 are input to a processing device (not shown). The processing device can perform image processing on the images of the first and second cameras 631, 632 to obtain the wall thickness WTh of the outer peripheral wall 20 and the thicknesses Th of the electrode layers 5. Hardware forming a control unit 64, which will be described later, may also serve as the processing device.

The control unit 64 is for performing control such that a predetermined value is added to the wall thickness WTh measured by the measurement units 63 to adjust the penetration depth of the processing tool 62 from the outer peripheral surface 10*a* of the honeycomb structure base body 10 to the radially inward direction, and the processing tool 62 is penetrated from the outer peripheral surface 10*a* of the honeycomb structure base body 10 to the radially inner direction at the adjusted penetration depth. In other words, the control unit 64 can add the predetermined value to the wall thickness WTh measured by the measurement units 63 to determine the penetration depth of the processing tool 62 from the outer peripheral surface 10*a* of the honeycomb structure base body 10 to the radially inward direction. The control unit 64 can control the displacement of the honeycomb structure base body 10 held by the holding portion 61 and/or the processing tool 62 such that the processing tool 62 is penetrated into the outer peripheral wall 20 of the honeycomb structure base body 10 up to the determined penetration depth of the processing tool 62. In the illustrated embodiment, the control unit 64 controls the displacement of the processing tool 62. The control of the displacement of the processing tool 62 may include the control of the displacement of the processing tool 62 in the radial direction of the honeycomb structure base body 10 and the control of the displacement of the processing tool 62 in the extending direction of the cells 21*a*.

Further, when forming the slits 3 at the positions where the electrode layers 5 are provided, the control unit 64 can perform control such that a predetermined value is added to the total value TV of the wall thickness WTh of the outer peripheral wall 20 and the thicknesses Th of the electrode layers 5 to adjust the penetration depth of the processing tool 62, and the processing tool 62 is penetrated from the outer peripheral surface 10*a* of the honeycomb structure base body 10 to the radially inward direction at the adjusted penetration depth. In other words, the control unit 64 can add the predetermined value to the total value TV of the wall thickness WTh and the thicknesses Th of the electrode layers 5 measured by the measurement units 63, thereby determining the penetration depth of the processing tool 62 from the outer peripheral surface 5*a* of the electrode layer 5.

The control unit 64 can be configured by hardware such as a computer or a dedicated circuit, for example. The predetermined value added to the wall thickness WTh and the total value TV when determining the penetration depth of the processing tool 62 may be input to the control unit 64 via a predetermined interface, or may be registered in the control unit 64 in advance.

The outer peripheral surface position specifying unit 65 is for specifying the outer peripheral surface position of the honeycomb structure base body 10 at a plurality of positions aligned in the extending direction of the cells 21*a*. The outer peripheral surface position specifying unit 65 can be configured by, for example, a laser displacement meter.

The control unit 64 controls the relative displacement of the honeycomb structure base body 10 and the processing tool 62 based on the outer peripheral surface position at each position specified by the outer peripheral surface position specifying unit 65. Further, when the control unit 64 relatively moves the honeycomb structure base body 10 and the processing tool 62 in the extending direction of the cells 21*a* after once penetrating the processing tool 62 into the honeycomb structure base body 10, the position of the processing tool 62 can be adjusted with respect to the penetration direction of the processing tool 62 into the honeycomb structure base body 10.

As in the illustrated embodiment, when the measurement units 63 measure both the first wall thickness WTh1 of the outer peripheral wall 20 on the one end face of the honeycomb structure base body 10 and the second wall thickness WTh2 of the outer peripheral wall 20 on the other end face, the control unit 64 can determine whether one of the first and second wall thicknesses WTh1, WTh2 is thicker than the other. When one of the first and second wall thicknesses WTh1, WTh2 is thicker than the other, the control unit 64 adds the predetermined value to one of the first and second wall thicknesses WTh1, WTh2 to adjust the penetration depth. This can lead to avoidance of any insufficient penetration depth of the processing tool 62 into the honeycomb structure base body 10, so that the slit 3 can be more reliably formed.

Further, as in the illustrated embodiment, when the measurement units 63 measure both the first wall thickness WTh1 of the outer peripheral wall 20 and the first thickness Th1 of the electrode layer 5 on the one end face of the honeycomb structure base body 10, and the second wall thickness WTh2 of the outer peripheral wall 20 and the second thickness Th2 of the electrode layer 5 on the other end face, the control unit 64 can determine whether one of the first total value TV1 (the total value of the first wall thickness WTh1 and the first thickness Th1) and the second total value TV2 (the total value of the second wall thickness WTh2 and the second thickness Th2) is larger than the other. When one of the first and second total values TV1, TV2 is larger than the other, the control unit 64 adds the predetermined value to one of the first and second total values TV1, TV2 to adjust the penetration depth. This can lead to avoidance of any insufficient penetration depth of the processing tool 62 into the honeycomb structure base body 10, so that the slit 3 can be more reliably formed.

While the preferred embodiments of the present invention have been described in detail above with reference to the drawings, the present invention is not limited to such embodiments. It is obvious that one of ordinary skill in the art to which the present invention belongs can arrive at various variations or modifications in the scope of the technical idea recited in the claims, and they are also understood to belong to the technical scope of the present invention.

EXAMPLES

Hereinafter, Examples are provided for a better understanding of the invention and its advantages, but they are not intended to limit the present invention. Based on the thickness t (mm) of the processing tool and the pitch p (mm) between the cells 21a, the present inventors investigated the shape of the slit 3 by variously adjusting the penetration depth of the processing tool 62 from the outer peripheral surface 10a of the honeycomb structure base body 10 to the radially inward direction. More particularly, the first and second wall thicknesses WTh1, WTh2 of the honeycomb structure base body 10 as each sample were measured, the predetermined value added to the thicker one of the first and second wall thicknesses WTh1, WTh2 (one of the first and second wall thickness WTh1, WTh2) was variously changed as a function of the thickness t (mm) of the processing tool or the pitch p (mm) between the cells 21a. The results are shown in the table below.

the first and second wall thicknesses WTh1, WTh2 is preferably t×0.1 or more. This is the same even when measuring only one of the first and second wall thicknesses WTh1, WTh2.

In addition, the symbol "x" in the judgment column in the table indicates that there is an abnormality in the test processing (the situation where the shape of the curved surface portion 62a of the machining tool 62 remains largely in the slit 3, or the partition wall 21 is damaged). Further, even by estimation, the symbol "x" has assumption that the shape of the curved surface portion 62a of the processing tool 62 remains largely in the slit 3 or the partition wall 21 is damaged, indicating a situation where the impact on quality is higher.

The symbol "Δ" indicates that the shape of the curved surface portion 62a of the processing tool 62 remains slightly in the slit 3 in the test processing. Moreover, the symbol "Δ" presumes a situation where the shape of the curved surface portion 62a of the processing tool 62 remains in the slit 3 even by estimation, indicating that the partition wall 21 is not damaged, and the impact on quality is lower.

Further, the symbol of circle indicates a situation where no abnormality was found in the test processing. Further, the symbol of circle presumes that the shape of the curved surface portion 62a of the processing tool 62 remains in the slit 3 by estimation, but it indicates situations where the abnormality is merely found or the abnormality is not found but it merely changes depending on variations, and the partition wall 21 is not be damaged, and there is substantially no impact on the quality.

Further, the symbol of double circle indicates a situation where no abnormality was found in the test processing. Also, the symbol of double circle indicates a situation where it is assumed that the shape of the curved surface portion 62a of the processing tool 62 does not remain in the slit 3, the partition wall 21 is not damaged, and the quality is more certainly not affected, even by estimation. In order to ensure

TABLE 1

| | Thickness t of Processing Tool [mm] | Predetermined Value [mm] | Appearance | Judgement |
|---|---|---|---|---|
| Example 1 | 0.6 | t × 0.10 | Remaining Grindstone Smaller | Δ |
| Example 2 | 0.6 | t × 0.15 | No abnormality | ○ |
| Example 3 | 0.6 | t × 0.20 | No abnormality | ○ |
| Example 4 | 0.6 | t × 0.25 | No abnormality | ◎ |
| Example 5 | 0.6 | t × 0.35 | No abnormality | ◎ |
| Example 6 | 0.6 | t × 0.45 | No abnormality | ◎ |
| Example 7 | 0.6 | Cell Pitch × 0.35 | No abnormality | ◎ |
| Comp. 1 | 0.6 | t × 0.05 | Remaining Grindstone Larger | X |
| Comp. 2 | 0.6 | Cell Pitch × 0.40 | Partition Wall Broken | X |

As shown in Example 1, when the predetermined value added to the thicker one of the first and second wall thicknesses WTh1, WTh2 was t×0.1, the shape of the curved surface portion 62a of the processing tool 62 slightly remained in the slit 3. In the table, the state where the shape of the curved surface portion 62a of the processing tool 62 remains in the slit 3 is indicated as "Remaining Grindstone R". The remaining of the shape of the curved surface portion 62a in Example 1 is practically no problem. On the other hand, as shown in Comparative Example 1, when the predetermined value was t×0.05, the shape of the curved surface portion 62a of the processing tool 62 remained largely in the slit 3. From this result, it was confirmed that the predetermined value (mm) added to the thicker one of that the shape of the curved surface portion 62a of the processing tool 62 does not remain in the slit 3 as in Examples 4 to 6, the predetermined value (mm) is more preferably t×0.25 or more.

Further, as shown in Example 7, when the predetermined value added to the thicker one of the first and second wall thicknesses WTh1, WTh2 is p×0.35, the partition wall 21 located ahead in the penetration direction of the processing tool 62 was not contacted with the tip portion of the processing tool 62. On the other hand, as shown in Comparative Example 2, when the predetermined value was p×0.40, the partition wall 21 located ahead in the penetration direction of the processing tool 62 was damaged due to contact with the processing tool 62. From the results, it was confirmed that the predetermined value (mm) added to the thicker one of the first and second wall thicknesses WTh1, WTh2 is preferably p×0.35 or less. This is the same even when measuring only one of the first and second wall thicknesses WTh1, WTh2.

DESCRIPTION OF REFERENCE NUMERALS

1: honeycomb structure
1a: outer peripheral surface
2: honeycomb structure portion
20: outer peripheral wall
20a: outer peripheral surface
21: partition wall
21a: cell
3: slit
5: electrode layer
5a: outer peripheral surface
6: production device
61: holding portion
62: processing tool
63: measurement unit
64: control unit
65: outer peripheral surface position specifying unit
10: honeycomb structure base body
10a: outer peripheral surface

The invention claimed is:

1. A method for producing a honeycomb structure, the honeycomb structure comprising a honeycomb structure portion having: an outer peripheral wall; and a partition wall arranged on an inner side of the outer peripheral wall, the partition wall defining a plurality of cells each extending from one end face to other end face to form a flow path, the honeycomb structure further comprising a plurality of slits each extending radially inward from an outer peripheral surface of the honeycomb structure and extending in an extending direction of the cells, wherein the method comprises:

a step of adjusting a penetration depth of a processing tool from an outer peripheral surface of a honeycomb structure base body having the honeycomb structure portion to a radially inward direction; and a step of forming at least one slit in the honeycomb structure base body according to the adjusted penetration depth, and wherein the penetration depth is adjusted by measuring a wall thickness of the outer peripheral wall of the honeycomb structure base body and then adding a predetermined value to the wall thickness; and wherein the predetermined value is t×0.1 or more and p×0.35 or less, in which t is a thickness of the processing tool (mm), and p is a pitch between the cells (mm).

2. The method for producing a honeycomb structure according to claim 1, wherein adjusting the penetration depth comprises adjusting the penetration depth by measuring the wall thickness of the outer peripheral wall on both the one end face and the other end face, defining the wall thickness of the outer peripheral wall on the one end face as a first wall thickness, defining the wall thickness of the outer peripheral wall on the other end face as a second wall thickness, and adding a predetermined value to one of the first and second wall thicknesses when one of the first and second wall thicknesses is thicker than the other.

3. The method for producing a honeycomb structure according to claim 1, wherein the honeycomb structure base body further comprises a pair of electrode layers each arranged on the outer surface of the outer peripheral wall so as to extend in a form of a band in an extending direction of the cells across a central axis of the honeycomb structure portion, and wherein adjusting the penetration depth when forming the slits at positions where the electrode layers are provided comprises adjusting the penetration depth by measuring the wall thickness of the outer peripheral wall of the honeycomb structure base body and a thickness of each of the electrode layers, and then adding a predetermined value to the total thickness value of the thickness of the honeycomb structure base body and the thicknesses of the electrode layers.

4. The method for producing a honeycomb structure according to claim 3, wherein adjusting the penetration depth when forming the slits at the positions where the electrode layers are provided comprises adjusting the penetration depth by measuring the wall thickness of the outer peripheral wall and the thicknesses of the electrode layers on both the one end face and the other end face, defining the total value of the wall thickness of the outer peripheral wall and the thickness of the electrode layer on the one end face as a first total value, defining the total value of the wall thickness of the outer peripheral wall and the thickness of the electrode layer on the other end face as a second total value, and adding a predetermined value to one of the first and second total values when one of the first and second total values is larger than the other.

5. The method for producing a honeycomb structure according to claim 1, further comprising a step of specifying an outer peripheral surface position of the honeycomb structure base body at a plurality of positions aligned in the extending direction of the cells, wherein, when forming the slits, the honeycomb structure base body and the processing tool are relatively displaced based on the outer peripheral surface position specified at the plurality of positions.

6. A device for producing a honeycomb structure, the honeycomb structure comprising a honeycomb structure portion having: an outer peripheral wall; and a partition wall arranged on an inner side of the outer peripheral wall, the partition wall defining a plurality of cells each extending from one end face to other end face to form a flow path, the honeycomb structure further comprising a plurality of slits extending radially inward from an outer peripheral surface of the honeycomb structure and extending in an extending direction of the cells, wherein the device comprises:

a holding portion for holding a honeycomb structure base body having the honeycomb structure portion;

a processing tool for forming the plurality of slits in the honeycomb structure base body held by the holding portion;

at least one measurement unit for measuring a wall thickness of the outer peripheral wall of the honeycomb structure base body; and a control unit for performing control such that a predetermined value is added to the wall thickness measured by the measurement unit to adjust a penetration depth of the processing tool from the outer peripheral surface of the honeycomb structure base body to a radially inward direction, and the processing tool is penetrated from the outer peripheral surface of the honeycomb structure base body to the radially inward direction at the adjusted depth; and wherein the predetermined value is t×0.1 or more and p×0.35 or less, in which t is a thickness of the processing tool (mm), and p is a pitch between the cells (mm).

7. The device for producing a honeycomb structure according to claim 6, wherein the measurement unit measures the wall thickness of the outer peripheral wall on both the one end face and the other end face, and wherein the control unit defines the wall thickness of the outer peripheral wall on the one end face as a first wall thickness, defines the wall thickness of the outer peripheral wall on the other end face as a second wall thickness, and adds a predetermined value to one of the first and second wall thicknesses to adjust the penetration depth when one of the first and second wall thicknesses is thicker than the other.

8. The device for producing a honeycomb structure according to claim 6, wherein the honeycomb structure base body further comprises a pair of electrode layers each arranged on the outer surface of the outer peripheral wall so as to extend in a form of a band in an extending direction of the cells across a central axis of the honeycomb structure portion, and wherein the measurement unit measures the wall thickness of the outer peripheral wall of the honeycomb structure base body and a thickness of each of the electrode layers at positions where the electrode layers are provided, and wherein the control unit adjusts the penetration depth by adding a predetermined value to the total value of the thickness of the honeycomb structure base body and the thicknesses of the electrode layers when forming the slits at the positions where the electrode layers are provided.

9. The device for producing a honeycomb structure according to claim 8, wherein the measurement unit measures the wall thickness of the outer peripheral wall and the thicknesses of the electrode layers on both the one end face and the other end face, and wherein the control units defines the total value of the wall thickness of the outer peripheral wall and the thickness of the electrode layer on the one end face as a first total value, defines the total value of the wall thickness of the outer peripheral wall and the thickness of the electrode layer on the other end face as a second total value, and adjusts the penetration depth by adding a predetermined value to one of the first and second total values when one of the first and second total values is larger than the other.

10. The device for producing a honeycomb structure according to claim 6, further comprising an outer peripheral surface position specifying unit for specifying an outer peripheral surface position of the honeycomb structure base body at a plurality of positions aligned in the extending direction of the cells, wherein the control unit controls relative displacement of the honeycomb structure base body and the processing tool based on the outer peripheral surface position specified at the plurality of positions.

* * * * *